US012668374B2

(12) United States Patent
Nourry et al.

(10) Patent No.: US 12,668,374 B2
(45) Date of Patent: Jun. 30, 2026

(54) DOUBLE-SHELL LIGHTNING PROTECTION CAP WITH IMPROVED ASSEMBLY

(71) Applicant: HUTCHINSON, Paris (FR)

(72) Inventors: Laurent Nourry, Saint Quentin sur Indrois (FR); Théo Juteau, Leigne sur Usseau (FR); Thierry Petitgas, Saint Georges les Baillargeaux (FR)

(73) Assignee: HUTCHINSON, Paris (FR)

( * ) Notice: Subject to any disclaimer, the term of this patent is extended or adjusted under 35 U.S.C. 154(b) by 183 days.

(21) Appl. No.: 18/333,479

(22) Filed: Jun. 12, 2023

(65) Prior Publication Data

US 2023/0399126 A1      Dec. 14, 2023

(30) Foreign Application Priority Data

Jun. 13, 2022    (FR) ...................................... 2205690

(51) Int. Cl.
*B64D 45/02*           (2006.01)
(52) U.S. Cl.
CPC .................................... *B64D 45/02* (2013.01)
(58) Field of Classification Search
CPC ............................... B64D 45/02; F16B 37/14
USPC ........................................................... 174/2
See application file for complete search history.

(56) References Cited

U.S. PATENT DOCUMENTS

| | | | |
|---|---|---|---|
| 10,982,704 B2 | 4/2021 | Auffinger | |
| 11,022,164 B2 | 6/2021 | Roper | |

FOREIGN PATENT DOCUMENTS

| | | |
|---|---|---|
| EP | 2713065 A2 | 4/2014 |
| GB | 2568069 A | 5/2019 |
| WO | 2013178985 A1 | 12/2013 |
| WO | 2014170674 A1 | 10/2014 |

OTHER PUBLICATIONS

French Search Report received for French Application No. FR2205690 on Jan. 19, 2023, 2 pgs.

*Primary Examiner* — Tremesha W Burns
(74) *Attorney, Agent, or Firm* — Merchant & Gould P.C.

(57)           ABSTRACT

A lightning protection cap is for sealing an attachment element attached to the structure of an aircraft. The lightning protection cap includes an inner shell defining an interior volume for receiving the attachment element and an outer shell configured to cover the inner shell. The inner and outer shells include complementary first and second attachment devices capable of cooperating to enable engagement of the outer shell on the inner shell. First and second attachment devices are configured to angularly lock the outer shell relative to the inner shell when the outer shell is rotated relative to the inner shell.

11 Claims, 6 Drawing Sheets a b c d

11a

DOUBLE-SHELL LIGHTNING PROTECTION CAP WITH IMPROVED ASSEMBLY

CROSS-REFERENCE TO RELATED APPLICATION

This U.S. patent application claims the benefit of French Patent Application No. 2205690 filed with the French Patent Office on Jun. 13, 2022, the entire contents of which is incorporated herein by reference.

TECHNICAL FIELD OF THE INVENTION

The invention relates to a lightning protection cap for sealing an attachment element attached to the structure of an aircraft. The invention also relates to an attachment device intended to be attached to an aircraft structure comprising such a lightning protection cap.

TECHNICAL BACKGROUND

Many aircraft have fuel tanks located under their wings. These fuel tanks, very often used as auxiliary tanks, are attached to the wings of the aircraft by attachment elements. Because of their location, these attachment elements, usually made of metal, are likely to represent points of impact for lightning when it strikes the aircraft. Given the danger of a fuel tank being struck by lightning, it has been proposed in the prior art that lightning protection caps can be attached to said attachment elements, typically rivets or bolts. The primary function of such caps is to protect the attachment elements to which they are attached from lightning strikes. However, given the power of these lightning strikes and the fact that they are repeated, sometimes on the same attachment element, additional precautions had to be taken to avoid a fuel leak and the consequences associated with such a leak, in particular the risk of fire.

The document WO 2013/178985 A1 proposes lightning protection caps designed to address this issue. The lightning protection cap has two shells, one inner and one outer, in the form of bells separated by a cavity filled with a sealing material. In this respect, the outer shell comprises on an upper surface of the bell shape an opening for filling the cavity with said sealing material, once the two shells are assembled. However, before the cavity can be filled, the clearance between the inner and outer shells must be eliminated to prevent irregularities appearing in the sealing material due to any displacement of the outer shell relative to the inner shell.

Various solutions have been proposed in document WO 2013/178985 A1 to address this issue. A first solution consisted in structuring the inner shell so that certain portions of its outer surface formed gripping means which, once the outer shell had been snapped onto said inner shell, provided surfaces for hooking the outer shell onto the inner shell. This solution does not prevent angular play between the inner shell and the outer shell. In addition, the vertical assembly of the two parts generates stresses on the shells that can exceed the elastic limit of the materials used, particularly for the smallest references. This significantly increases the risk of the shells breaking when the lightning protection cap is manufactured. A second solution was to weld or glue the two shells together before introducing the sealing material into the cavity. However, this solution involves a gluing or welding step, in addition to the step of snapping the outer shell onto the inner shell. A third solution was to replace the two shells with a single part, produced by additive manufacturing, for example. However, given the complexity of the shapes of the shells, it goes without saying that the cost of manufacturing the lightning protection cap in this way is very high.

More recently, efforts have been made to improve the assembly of the outer shell and the inner shell. GB 2568069 A discloses a lightning protection cap comprising an inner shell and an outer shell on which means are provided for assembling the outer shell to the inner shell. The inner shell comprises three evenly spaced slots through which protrusions of the outer shell can pass to allow the outer shell to reach a pre-assembly position. Once this position has been reached, the protrusions of the outer shell are able to rotate about the axis L of the cap, lodging under a ridge of the inner shell and resting on lower surfaces of the ridge until they reach protrusions of the inner shell. There is no guarantee that the outer shell will not rotate relative to the inner shell. This is because the protrusions of the outer shell are held to the protrusions of the inner shell by friction. Assembly can therefore be difficult and/or imprecise if the protrusions are very rigid and/or the parts do not fit precisely. In addition, because the inner and outer shells are assembled by friction, the solution presented in this document has every interest in offering the highest possible friction resistance, for example to enable the assembler to detect contact when the protrusions overlap, and therefore to multiply the contact zones between the two shells. Three contact zones are therefore provided in the examples shown.

The invention provides a double-shell lightning protection cap that is both simple and reliable to assemble.

SUMMARY OF THE INVENTION

In this regard, the invention provides a lightning protection cap for sealing an attachment element attached to the structure of an aircraft, the lightning protection cap comprising an inner shell defining an interior volume for receiving the attachment element and an outer shell configured to cover the inner shell, said inner and outer shells comprising first and second complementary attachment means capable of cooperating so as to enable the engagement of the outer shell with the inner shell.

The lightning protection cap according to the invention is characterised in that one of the inner shell and the outer shell comprises second attachment means, said second attachment means comprising at least one lug, and in that the other of the inner shell and the outer shell comprises the first attachment means including a ramp and a protuberance separated from the ramp so as to form a housing between the ramp and the protuberance, said ramp being configured to allow the lug to slide until the housing when the outer shell is rotated relative to the inner shell, so as to angularly lock the outer shell relative to the inner shell.

When the outer shell reaches its final position, said at least one lug is held fixed in the housing. The housing is delimited laterally by the ramp, on one side of said housing, and by the protuberance, on the other side of the housing, which enables to angularly lock the outer shell relative to the inner shell and therefore to ensure that the outer shell is prevented from rotating relative to the inner shell. In addition, the points of contact between the inner shell and the outer shell are very localised, which limits the risk of permanent deformation or even breakage of the outer shell. In addition, access from the lug to the housing is via the ramp, which allows progressive deformation of the outer shell during assembly.

According to various features of the invention, which may be taken together or separately:

the first attachment means consists of a single assembly formed by the protuberance and the ramp, the protuberance being separated from the ramp so as to form the housing;

the housing comprises an upper stop and said at least one lug comprises an edge bearing against said stop when the outer shell is locked angularly relative to the inner shell, so as also to lock the outer shell axially relative to the inner shell;

the second attachment means comprise a plurality of lugs distributed around the circumference of an inner surface of the outer shell;

the shell comprising the first attachment means also comprises a plurality of protuberances distributed around the circumference of an outer surface of said inner shell;

the inner shell and the outer shell are made of polyethyleneimine, the outer shell is bell-shaped;

the outer shell comprises a flared portion and a dome surmounting the flared portion, said lug(s) being located at the flared portion;

the inner shell comprises a cylindrical portion and a dome surmounting the cylindrical portion, the sliding ramp, the protuberance, and the housing being located at the cylindrical portion;

the shell comprising the first attachment means also comprises an annular protuberance delimiting the ramp, the protuberance, and the housing.

The invention further relates to an attachment device intended to be attached to an aircraft structure comprising an attachment element and a lightning protection cap as previously described, wherein said lightning protection cap is mounted on the attachment element so as to cover the attachment element.

BRIEF DESCRIPTION OF THE FIGURES

Further objects and characteristics of the invention will become clearer in the following description, made with reference to the attached figures, in which.

DETAILED DESCRIPTION OF THE INVENTION

The invention relates to a lightning protection cap 1 for sealing an attachment element attached to the structure of an aircraft. Like the lightning protection caps described in the preamble to this detailed description, the lightning protection cap 1 according to the invention has a dual role, since not only does it aim to protect the attachment element with which it is associated, but it also aims to guarantee the watertightness of the aircraft structure, at the attachment element, should said attachment element nevertheless develop any cracks following a lightning strike.

Figure 1:
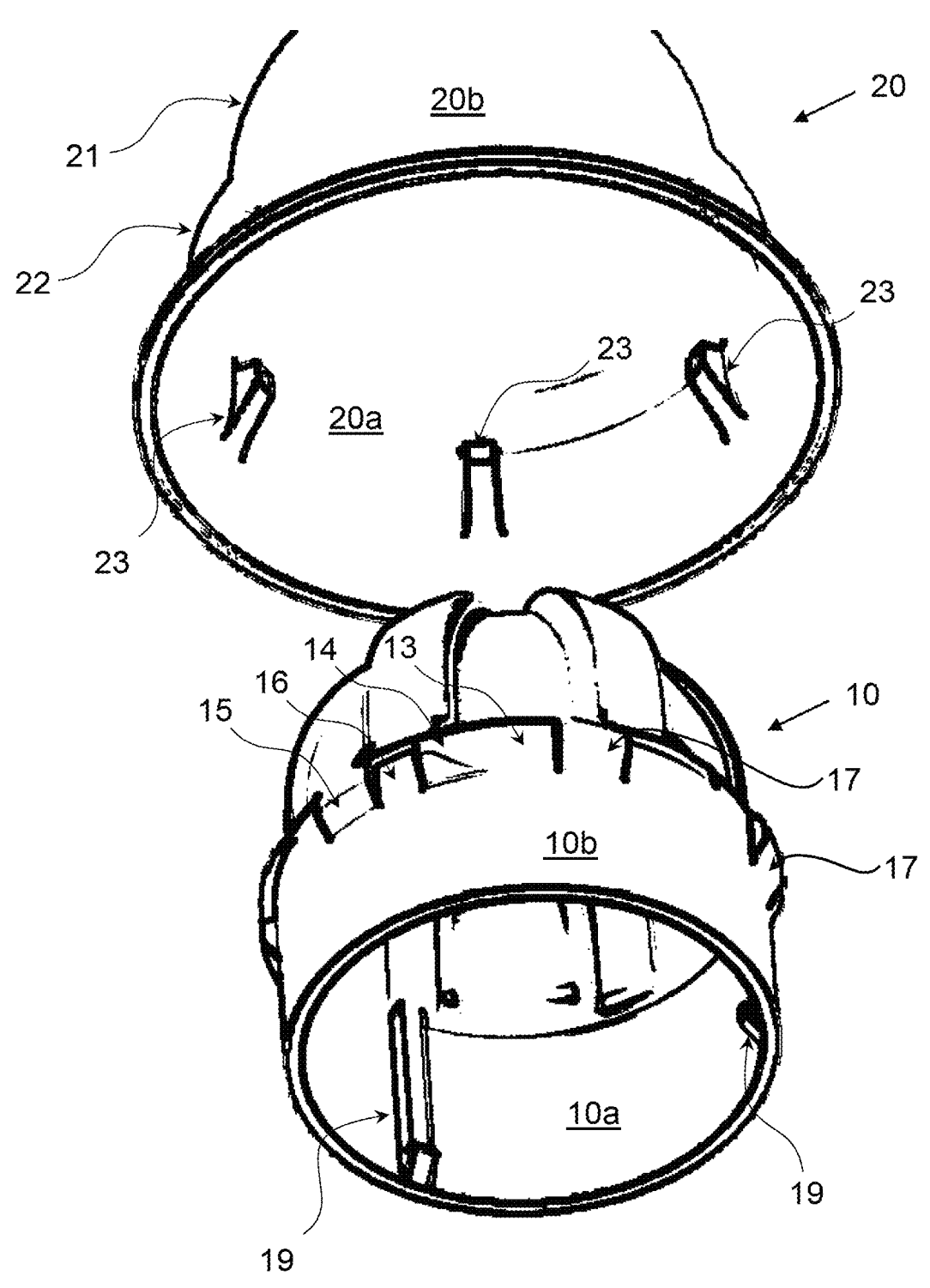
FIG. 1 is a perspective bottom view of an inner shell and an outer shell of a lightning protection cap according to the present invention in a disassembled configuration.

The lightning protection cap 1 comprises an inner shell 10 and an outer shell 20, the characteristics of which will be detailed below. As shown in FIG. 1, the lightning protection cap is disassembled, making it easier to distinguish the respective features of the inner shell 10 and the outer shell 20.

The inner shell 10 defines an internal volume designed to receive the attachment element. The shape and dimensions of the internal volume are therefore adapted to the geometry of the attachment element used and will not be described further in this description. Nevertheless, the perspective view shown in FIG. 1 from below the inner shell 10 enables to distinguish certain elements of the shell. The inner shell 10 comprises a plurality of hooking means 19 configured to enable said inner shell 10 to be attached to the attachment element with which it is associated. In the example shown, the hooking means 19 are in the form of tongues arranged, preferably regularly, around the circumference of an inner surface 10a of the inner shell. Again, according to the illustrated embodiment, each of the tongues has a hook-shaped projection at one of its ends, giving it the appearance of a hooking tab. Each tongue can thus be reliably and securely attached to the attachment element with which it is associated.

Figure 2A:
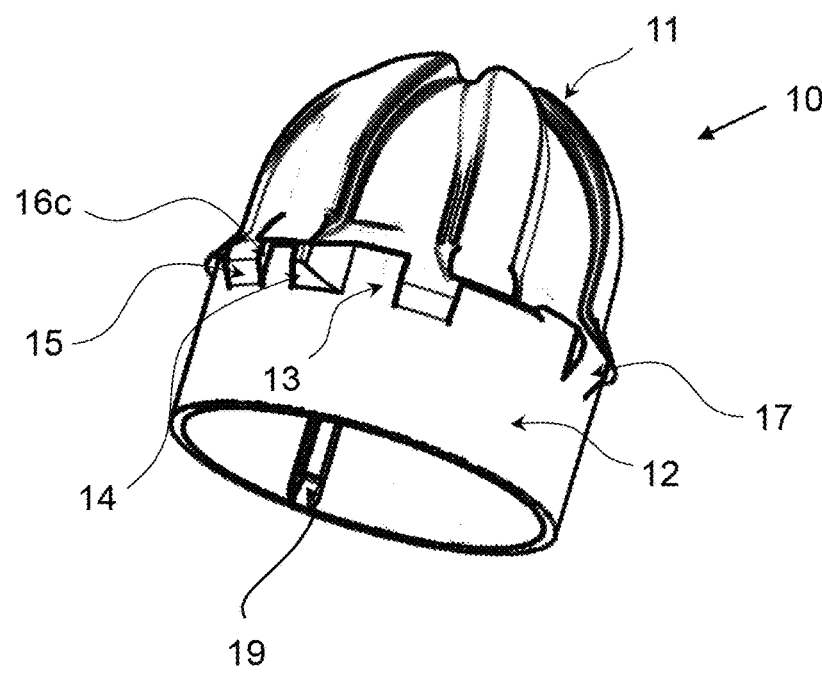
FIG. 2a is a perspective bottom view of an inner shell of a lightning protection cap according to the present invention.
Figure 2B:
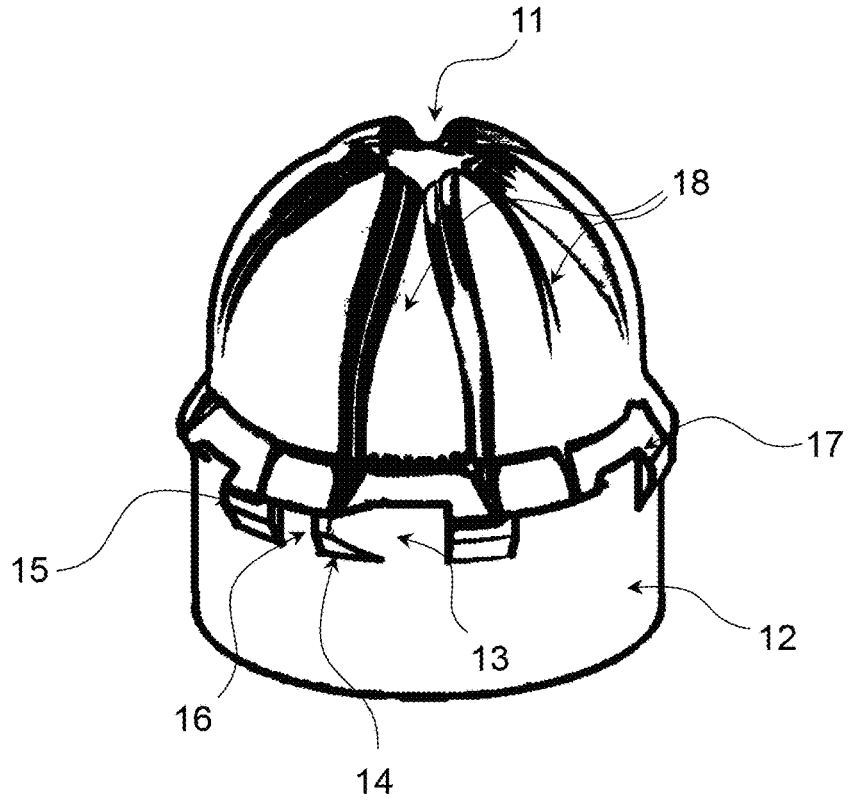
FIG. 2b is a perspective top view of an inner shell of a lightning protection cap according to the present invention.

In addition, as better illustrated in FIGS. 2a and 2b, the inner shell 10 comprises a cylindrical portion 12 and a dome 11 surmounting the cylindrical portion 12. The dome 11 comprises a plurality of cavities 18 of predetermined shape, generating an inter-shell volume sufficient to allow the flow of sealing material between the inner shell 10 and the outer shell 20 when the outer shell 20 is assembled with the inner shell 10. The inter-shell volume is the volume between the inner shell 10 and the outer shell 20 when the outer shell 20 is assembled with the inner shell 10. The aforementioned hooking means 19 are located on the inner surface 10a of the cylindrical portion 12.

The outer shell 20 is designed to cover the inner shell 10. In the example illustrated in the figures, the outer shell 20 comprises a flared portion 22 and a dome 21 surmounting the flared portion, giving it a bell shape. As can be seen more clearly in FIG. 3, the dome 21 of the outer shell has a curvature substantially identical to that of the dome 11 of the inner shell 10—without, however, comprising cavities, which delimits a volume allowing the sealing material to be introduced into the inter-shell volume—but this is not compulsory. In practice, the shape, and dimensions of the outer shell 20 should be assessed as far as possible in relation to those of the inner shell 10, and vice versa. In this respect, the outer shell 20 also includes an opening 25, located at the top of its dome 21, forming a passage for the sealing material during manufacture. In addition to its shape, the outer shell 20 also has appropriate dimensions to enable it to be positioned around the inner shell 10.

According to the invention, the inner and outer shells 10, 20 comprise complementary attachment means 14, 15, 16, 16a, 23, 23a, capable of cooperating to enable the outer shell 20 to be engaged on the inner shell 10. More specifically, one of the inner shell 10 and the outer shell 20 comprises attachment means 14, 15, 16, 16a which, although distinct from attachment means 23, 23*a* of the other shell, are functionally dependent on said attachment means 23, 23*a* of the other shell. In other words, the attachment means 14, 15, 16, 16*a* and the attachment means 23, 23*a* complement each other to enable the outer shell 20 to be fixed around the inner shell 10. In the remainder of this description, "first attachment means" will refer to attachment means 14, 15, 16 and 16*a* and "second attachment means" will refer to attachment means 23 and 23*a*.

According to a first embodiment of the present invention, the inner shell 10 comprises the first attachment means while the outer shell 20 comprises the second attachment means. This embodiment is the subject of FIGS. 1 to 6*d*. The first attachment means comprise a ramp 14 and a protuberance 15 separated from the ramp 14 to form a housing 16.

In the embodiment shown, the ramp 14 is shaped like an oblique pyramid that is truncated at the top. The oblique, truncated pyramid has a base, in the geometric sense of the term, located at the level of the outer surface 10*b* of the inner shell. Its height, also in the geometric sense, corresponds to the distance separating the truncated apex of the pyramid from the outer surface 10*b* of the inner shell. It should also be pointed out that, because of its obliquity, the ramp 14 has a predetermined inclination, in this case advantageously towards the housing 16. In this respect, the truncation at the top of the pyramid is advantageously rounded or curved which, together with the inclination of the ramp 14, helps to form a surface, known as the sliding surface, allowing progressive displacement of one of the second attachment means, further described later in the description. The ramp 14 is not limited in its shape and can adopt any other desired shape, as far as it accompanies the movement of the aforementioned second attachment means in the housing 16 and, as will be explained below, forms a lateral stop for this second attachment means.

Figure 3:
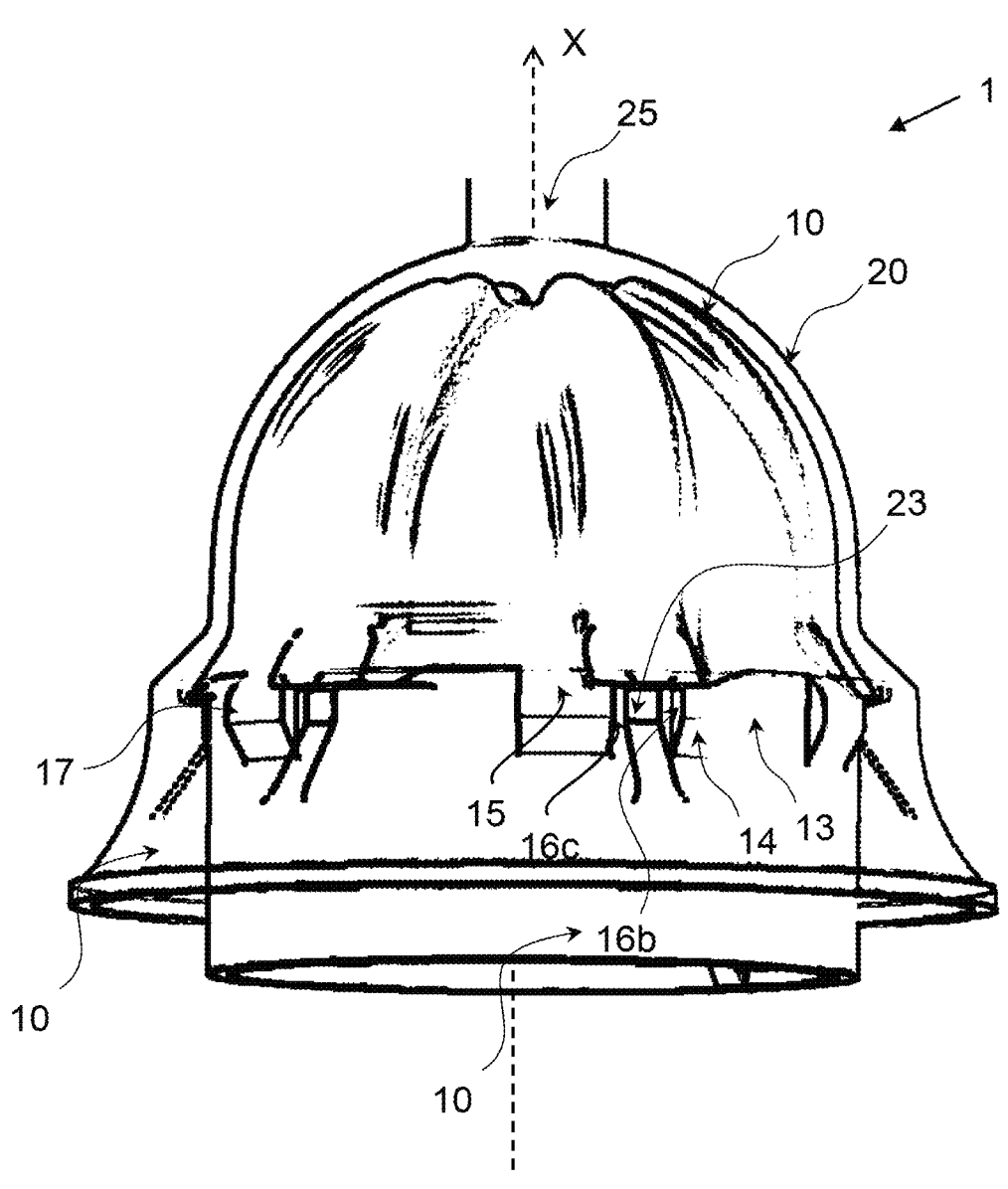
FIG. 3 is a side view of a lightning protection cap according to the present invention in the assembled position.
Figure 4:
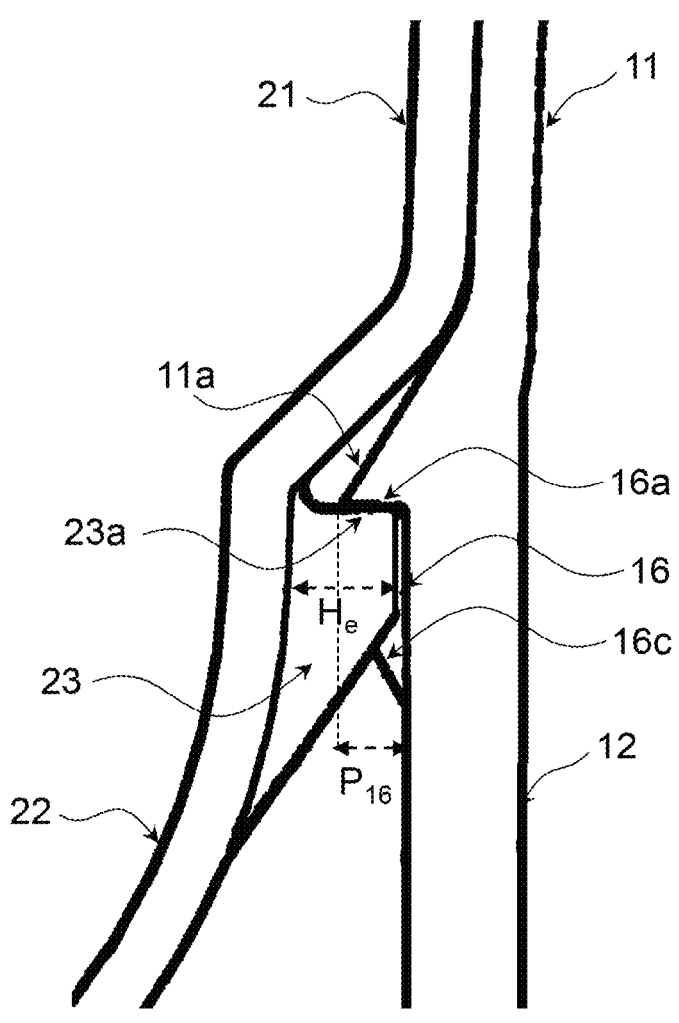
FIG. 4 is a cross-sectional view of a lightning protection cap according to the present invention illustrating certain attachment means the outer shell and the inner shell.
Figure 5:
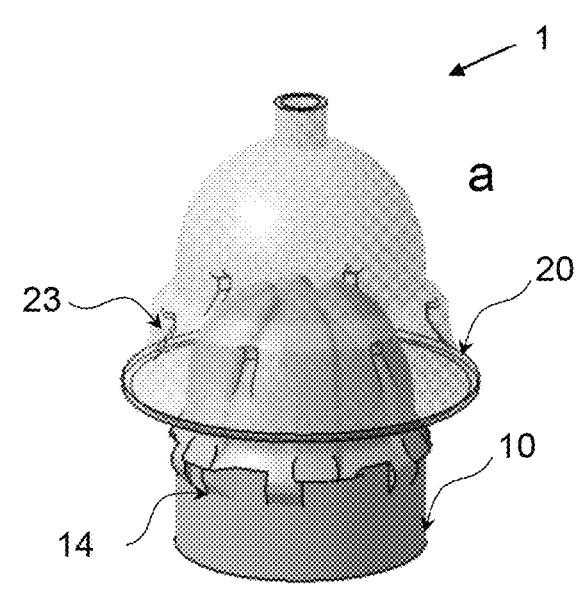
FIGS. 5a-5c illustrate the assembly stages of a lightning protection cap according to the present invention before the outer shell is locked to the inner shell.
Figure 5:
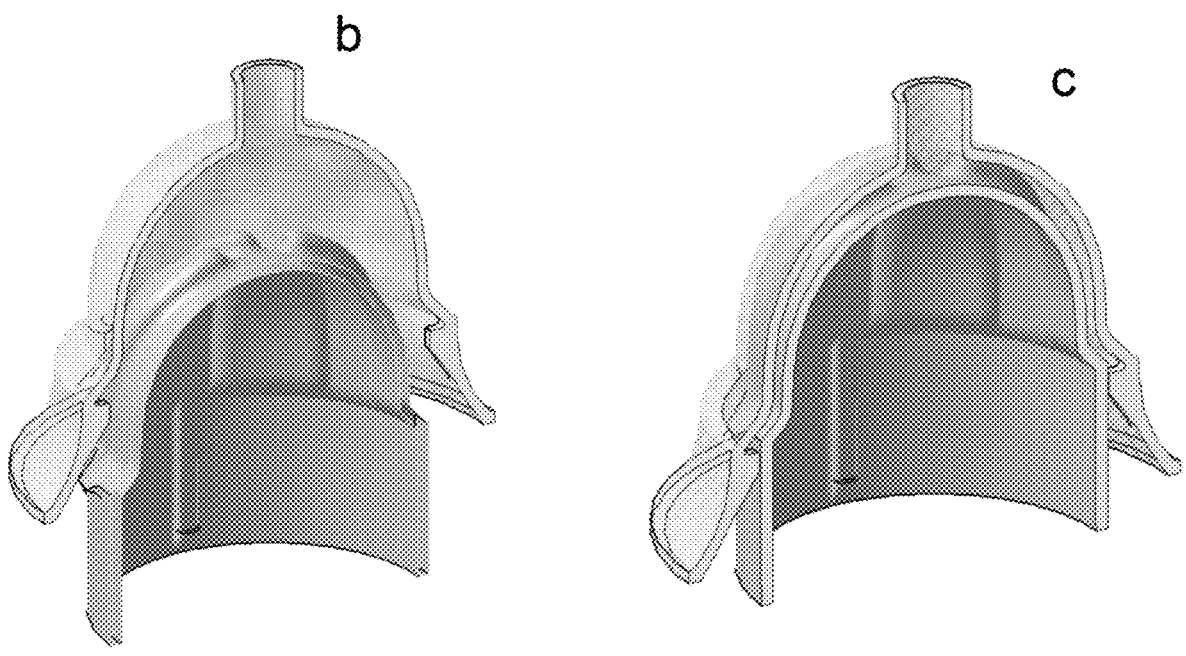
Figure 6:
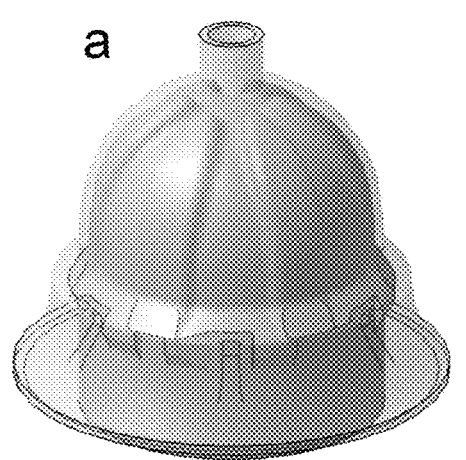
FIGS. 6a-6d illustrate the steps involved in assembling a lightning protection cap according to the present invention, following the steps in FIG. 5, until the outer shell is locked onto the inner shell.
Figure 6:
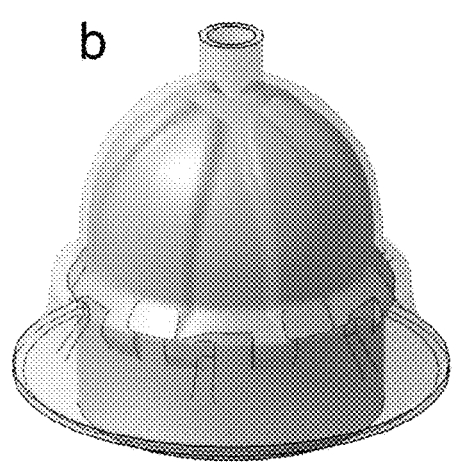
Figure 6:
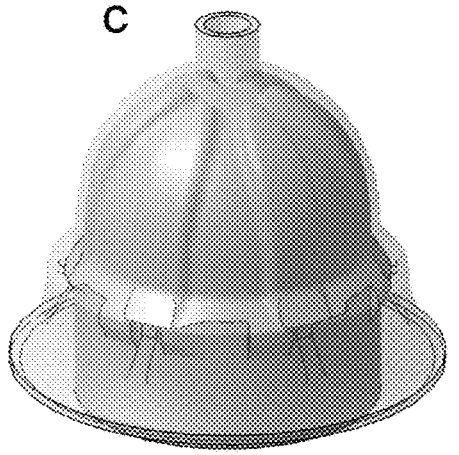
Figure 6:
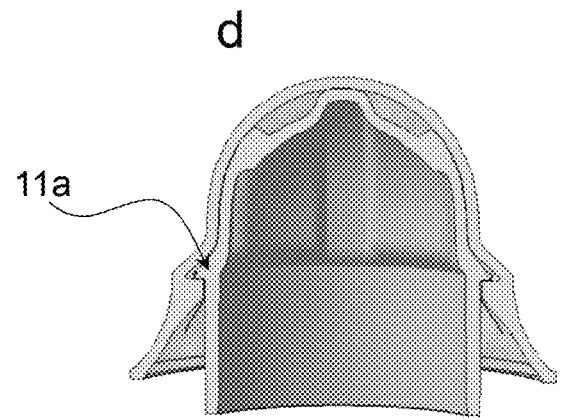

The housing 16 is bounded laterally on one side by the ramp 14 and on the other side by the protuberance 15. It comprises a first lateral stop 16*b* formed by the side of the ramp 14 delimiting it (FIG. 3) and a second lateral stop 16*c* formed by the side of the protuberance 15 delimiting it (FIGS. 2*a*, 3, 4). This enables the outer shell 20 to be joined to the inner shell 10 without any angular play between the inner 10 and outer 20 shells. In other words, this configuration allows the outer shell 20 to be angularly locked relative to the inner shell 10 when the outer shell 20 is rotated around the inner shell 10.

In this respect, in addition to the fact that the housing 16 occupies an intermediate position between the ramp 14 and the protuberance 15, it very advantageously has dimensions adjusted to those of the second attachment means 23, 23*a*. The dimensions of the housing 16 are said to be "adjusted" to those of the second attachment means 23, 23*a*, when the first and second lateral stops 16*b*, 16*c* are as close as possible to the sides of the attachment means 23 of the outer shell 20, in any case so that the latter is locked around the inner shell 10. In addition, like the ramp 14, the shape of the housing 16 is not limited to the illustrated design. What is important in the context of the invention is that the housing 16 is dimensioned to enable the outer shell 20 to be locked at an angle to the inner shell 10.

In the illustrated embodiment, the protuberance 15 is close to the form of a hexagonal half-prism, with a base at the level of the outer surface 10*b* of the inner shell and a height preferably substantially equal to the height of the ramp 14, base and height being understood in the geometric sense of the term. The height here corresponds to the distance between the base of the hexagonal half-prism and its face furthest from the base. Like the ramp 14 and the housing 16, the shape of the protuberance 15 is not limiting, the important thing being that the protuberance 15 is configured to form the lateral stop for the lug 23, which is achieved by its simple presence on one side of the housing 16.

As can be seen from the figures, the ramp 14, the protuberance 15 and the housing 16 are located at the cylindrical portion 12 on the outer surface 10*b* of the inner shell 10. They are substantially in the same angular alignment as the second attachment means, themselves located at the flared portion 22 on an inner surface 20*a* of the outer shell 20, which enables them to cooperate and subsequently lock the outer shell 20 to the inner shell. This can be seen in particular in FIG. 3, which shows the lightning protection cap 1 according to the invention in the assembled configuration.

Referring to FIG. 1, there is shown some of the second attachment means 23 on the outer shell 20 from below. The second attachment means 23 comprise at least one lug. Preferably, they comprise a plurality of lugs distributed around the circumference of an inner surface 20*a* of the outer shell 20. This increases the likelihood that the outer shell 20 will lock around the inner shell 10 on the first attempt and therefore simplifies the assembly of the lightning protection cap 1 according to the invention. The greater the number of lugs 23, the greater the probability that one of them will reach the pre-assembly position, as described below.

In the illustrated embodiment, the lugs 23 have a shape approximating that of a truncated pyramid, although they do not necessarily have the shape illustrated. The angular lateral dimension of each lug 23, i.e. the width of each lug, is adjusted to the dimensions of the housing 16. In other words, the width of each lug 23 is substantially equal to the distance separating the first lateral stop 16*b* from the second lateral stop 16*c*, without however exceeding this distance, which enables the lug 23 that will reach the housing 16 to be locked between the first and second lateral stops 16*b*, 16*c* and therefore enables the outer shell 20 to be rotated about the inner shell without any angular play between said inner 10 and outer 20 shells. As an alternative to lugs 23, hooks could be used. In this case, it would be more appropriate to have a housing 16 whose shape is better suited to such a configuration. In any event, the shape of the second attachment means is not limitative, as indicated above. It only needs to be adapted to the size of the housing 16.

The assembly of the lightning protection cap 1 according to the invention is described below with reference to FIGS. 5*a* to 6*d*.

In a first step, certain key moments of which are illustrated in FIGS. 5*a*, 5*b* and 5*c*, the outer shell 20 is inserted vertically onto the inner shell 10. Preferably, as shown in FIG. 5*a*, the lugs 23 are aligned with the cavities 18 in the dome 11. In other words, the position of the outer shell 20 relative to the inner shell 10 is chosen so that the lugs 23 face the cavities 18 when the outer shell 20 is placed on the inner shell 10. The cavities 18 also act as indexing means and facilitate pre-assembly of the outer shell 20 relative to the inner shell 10, as described below. However, marking means can be placed on the inner shell 10, without affecting the assembly described above. For example, two diametrically opposed grooves could be positioned on the cylindrical portion 12 in correspondence with lugs 23 on the outer shell.

FIG. 5*c* is equivalent to FIG. 6*a*, except that FIG. 5*c* is a cross-sectional view of the lightning protection cap, whereas FIG. 6*a* is a perspective view. In FIG. 6*a*, the outer shell 20 is positioned relative to the inner shell 10 to be in a position known as the pre-assembly position. This position is so called because it is the position in which the outer shell 20 is located before it is rotated around the inner shell 10. In this respect, the inner shell 10 comprises a pre-assembly zone 13 adjacent to the ramp 14. The outer shell 20 is in the pre-assembly position when one of the lugs 23 is in correspondence with the pre-assembly zone 13, i.e. opposite said pre-assembly zone 13. In practice, as we have already seen, a plurality of lugs are distributed around the circumference of the inner surface 20a of the outer shell, which increases the probability that one of the lugs 23 will reach the pre-assembly zone 13 as soon as the assembler makes his first gesture. As soon as the outer shell 20 reaches the pre-assembly position, the lug 23 in question is positioned appropriately to rotate the outer shell 20 around the inner shell.

Then, as shown in FIG. 6b, the outer shell 20 is rotated around the inner shell 10. The lug 23 gradually slides out of the pre-assembly area 13 (FIG. 6a) to ramp 14 (FIG. 6b), then slides on the sliding surface of the ramp 14 (not shown) before reaching the housing 16 (FIG. 6c, see also FIG. 3). When the lug 23 passes over the ramp 14, a moderate stress is exerted on both the inner shell 10 and the outer shell 20. This stress causes slight deformation of the inner and outer 20 shells. The latter are advantageously made of polyethyleneimine (PEI), which enables them to withstand annular stresses while remaining sufficiently resistant to fuel in the event of a leak. Once the lug 23 is in the housing 16, the arrangement of the lateral stops 16b and 16c in relation to the lug 23 enables the outer shell 20 to be locked against rotation in relation to the inner shell 10. That said, the inner shell 10 and outer shell 11 could also be made of polyamide 11 or polyamide 12. Although these two materials are very similar, polyamide 11 has the advantage of being of renewable origin and of having better mechanical properties. It has improved impact and abrasion resistance compared with polyamide 12, giving it a longer service life.

At this stage, it is probably worth pointing out that the cooperation between the first attachment means and the second attachment means provides such reliable angular locking that there is no need to add to the assembly formed by the ramp 14 and the protuberance 15 a second assembly formed by a second ramp with a second protuberance separated from the second ramp by a second housing. In other words, a single assembly consisting of the ramp 14 and the protuberance 15 is sufficient to lock the outer shell 20 at an angle to the inner shell 10 when the outer shell is rotated around the inner shell. Furthermore, this is highly advantageous in that the use of a single assembly formed by the ramp 14 and the protuberance 15 further limits the risk of permanent deformation and breakage of the outer shell via the lug 23 concerned.

That said, it is possible to make the assembly of the outer shell 20 with the inner shell even more reliable. In this respect, as illustrated in FIG. 4, the housing 16 comprises an upper stop 16a with which an edge 23a of the lug capable of coming into contact when the outer shell 20 is locked at an angle relative to the inner shell 10. This locks the outer shell 20 axially to the inner shell 10. The axis referred to above is a longitudinal X axis of the lightning protection cap 1 according to the invention. So, as soon as the lug 23 reaches the housing 16, the inner 10 and outer 20 shells can no longer move relative to each other because the lug 23 is locked into the housing 16 (angular locking by the ramp H and the protuberance 15, which are stops, and axial locking by the upper stop 16a). In other words, only a deterioration, i.e. a definitive structural alteration, of the lightning protection cap 1 of the invention would allow them to move relative to each other again. Because of the presence of the lateral stops 16b and 16c as well as the upper stop 16a, a very large force would be required to achieve such a goal, which is clearly undesirable in the context of the present invention.

It should be noted that it is not necessary for the face of the lug 23 facing a bottom of the housing 16 to rest on the bottom of the housing 16, the bottom of the housing 16 corresponding to the face of the housing 16 located at the level of the outer surface 10b of the inner shell 10. The contact zone between the edge 23a and the upper stop 16a of the housing ensures that the translational locking is maintained. In this respect, in the illustrated embodiment, the upper stop 16a is formed by an annular protuberance 11a extending around the entire circumference of the inner shell 10 in the area adjoining both the dome 11 and the cylindrical portion 12. The annular protuberance 11a is therefore located at the base of the dome 11 of the inner shell. In addition to the housing 16, the annular protuberance 11a also delimits the ramp 14 and the protuberance 15, in particular their respective upper faces.

It should also be noted that the height $H_e$ of the lugs is adjusted to the height of the ramp 14 and the depth $P_{16}$ of the housing 16. The height $H_e$ of the lug corresponds to the distance between the face intended to be opposite the bottom of the housing 16 and the inner surface 20a of the outer shell (FIG. 4). The depth $P_{16}$ of the housing refers to the distance between a distal end of the protuberance forming the upper stop 16a and the bottom of the housing. The height $H_e$ of the lugs is chosen to allow the lugs to pass over the ramp 14 while being sufficient to hold the lug 23 in the housing 16 once it has reached said housing. As can be deduced from the above, the height $H_e$ of the lug also determines the contact surface available with the edge 23a.

In addition, if the combination of the first attachment means 14, 15 and 16 with the second attachment means 23 and 23a is sufficient to achieve the purpose of the invention, it is possible to make the assembly of the shells even more rigid. In addition to the protuberance 15, the inner shell 10 may comprise a plurality of other protuberances 17 distributed over the outer surface 10b of the inner shell. The other protuberances 17 can advantageously have a similar shape to that of the protuberance 15 associated with the ramp 14 and the housing 16. Advantageously, the other protuberances 17 enable radial pressure to be exerted on the outer shell 20, thereby stiffening the assembly of the shells. Incidentally, as shown in FIG. 3, the other protuberances 17 can also act as bearing surfaces for the lugs 23. However, such an arrangement is not mandatory to achieve the objective of the invention. The angular locking of the outer shell 20 relative to the inner shell 10 is ensured by the locking of the lug 23 in the housing 16, in particular between the lateral stops 16b, 16c.

It should be noted that when the inner 10 and outer 20 shells are assembled in this way (FIGS. 3 and 6d), the outer surface 10b of the inner shell and the inner surface 20a of the outer shell are in contact with each other, except for the areas where the cavities 18 are located. As a reminder, the cavities generate a sufficient inter-shell volume to allow the sealing material to flow between the inner shell 10 and the outer shell 20. The contact zones between the inner shell 10 and the outer shell 20 also stiffen the assembly of the shells.

In a second embodiment of the lightning protection cap according to the present invention, the outer shell 20 comprises the first attachment means while the inner shell 10 comprises the second attachment means. However, implementation is less practical than the first method. Simply make sure that you swap both the first attachment means and the second attachment means as well as the other protuberances 17, the first attachment means being located on the inner surface 20*a* of the outer shell and the second attachment means being located on the outer surface 10*b* of the inner shell. Furthermore, all that has been said with regard to the shape and dimensions of the inner shell 10 and outer shell 20 continues to apply, as do the specific examples.

Thus, in the second embodiment, the lightning protection cap 1 for sealing an attachment element attached to the structure of an aircraft comprises the inner shell 10, said inner shell 10 delimiting the interior volume intended to receive the attachment element, and the outer shell said outer shell being configured to cover the inner shell 10. The inner and outer shells 10, comprise complementary first and second attachment means 14, 15, 16, 16*a*, 23, 23*a*, capable of cooperating to enable the outer shell 20 to be engaged on the inner shell 10.

The lightning protection cap 1 according to the second embodiment is characterised in that the inner shell 10 comprises the second attachment means 23, 23*a*, said second attachment means 23, 23*a* comprising at least one lug 23, and in that the outer shell 20 comprises the first attachment means 14, 15, 16, including the ramp 14 and the protuberance 15 separated from the ramp 14 so as to form the housing 16 between the ramp 14 and the protuberance 15, said ramp 14 being configured to allow the lug 23 to slide into the housing 16 when the outer shell 20 is rotated relative to the inner shell 10, so as to angularly lock the outer shell 20 relative to the inner shell 10.

The invention also relates to an attachment device intended to be attached to an aircraft structure comprising an attachment element and a lightning protection cap as previously described. The attachment element may be the head of a bolt, a screw, etc. The lightning protection cap 1 is mounted on the attachment element to cover said attachment element.

The invention claimed is:

1. A lightning protection cap for sealing an attachment element attached to the structure of an aircraft, the lightning protection cap comprising: an inner shell defining an interior volume for receiving the attachment element and an outer shell configured to cover the inner shell, the inner and outer shells comprising complementary first and second attachment means configured for cooperating to enable engagement of the outer shell on the inner shell;

wherein one of the inner shell or the outer shell comprises the second attachment means, said second attachment means comprising at least one lug; and wherein the other of the inner shell and the outer shell comprises the first attachment means, including a ramp and a protuberance separated from the ramp to form a housing between the ramp and the protuberance, said ramp, said housing and said protuberance being circumferentially and consecutively arranged with said housing intermediate said ramp and said protuberance, said ramp being configured to allow the lug to slide until reaching the housing when the outer shell is rotated relative to the inner shell, in order for the housing to angularly lock the outer shell relative to the inner shell.

2. The lightning protection cap according to claim 1, wherein the first attachment means comprises a single assembly formed by the protuberance and the ramp, the protuberance being separated from the ramp to form the housing.

3. The lightning protection cap according to claim 1, wherein the housing comprises an upper stop and said at least one lug comprises an edge bearing against said stop when the outer shell is locked angularly relative to the inner shell, to lock the outer shell axially relative to the inner shell.

4. The lightning protection cap according to claim 1, wherein the second attachment means comprise a plurality of lugs distributed around the circumference of an inner surface of the outer shell.

5. The lightning protection cap according to claim 1, wherein the shell comprising the first attachment means further comprises a plurality of protuberances distributed around the circumference of an outer surface of said shell.

6. The lightning protection cap according to claim 1, wherein the inner shell and the outer shell are made of polyethyleneimine (PEI).

7. The lightning protection cap according to claim 1, wherein the outer shell is bell-shaped, said outer shell comprising a flared portion and a dome surmounting the flared portion, said at least one lug being located at the flared portion.

8. The lightning protection cap according to claim 1, wherein the inner shell comprises a cylindrical portion and a dome surmounting the cylindrical portion, the sliding ramp, the protuberance, and the housing being located at the cylindrical portion.

9. The lightning protection cap according to claim 1, wherein the shell comprising the first attachment means further comprises an annular protuberance delimiting the ramp, the protuberance, and the housing.

10. An attachment device configured to attach to an aircraft structure comprising an attachment element and the lightning protection cap according to claim 1, wherein said lightning protection cap is mounted on the attachment element to cover said attachment element.

11. The lightning protection cap according to claim 1, wherein the first attachment means consists of a single assembly formed by the protuberance and the ramp, the protuberance being separated from the ramp to form the housing.

* * * * *